United States Patent

Hayakawa et al.

[11] Patent Number: 6,157,882
[45] Date of Patent: *Dec. 5, 2000

[54] VEHICULAR INPUT SIGNAL DETECTING SYSTEM

[75] Inventors: Hirotaka Hayakawa; Masao Saito; Masaharu Chiba; Kenji Suzuki, all of Anjo, Japan

[73] Assignee: Aisin AW Co., Ltd., Anjo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,559

[22] Filed: Jun. 4, 1997

[30] Foreign Application Priority Data

Jun. 25, 1996 [JP] Japan ..................................... 8-185569

[51] Int. Cl.[7] ............................. G06F 17/00; G06F 19/00
[52] U.S. Cl. ................................. 701/51; 701/22; 701/66; 477/129
[58] Field of Search .................................. 701/51, 66, 22, 701/85, 87, 106; 477/49, 129, 111; 123/179.14

[56] References Cited

U.S. PATENT DOCUMENTS

| 3,861,366 | 1/1975 | Masaki et al. ........................ 123/438 |
| 4,086,518 | 4/1978 | Wilkinson ............................. 318/127 |
| 4,344,399 | 8/1982 | Matsumura et al. ................... 477/111 |
| 4,486,838 | 12/1984 | Itoh et al. ............................... 701/66 |
| 4,657,522 | 4/1987 | Miyawaki ............................... 477/49 |

Primary Examiner—William A. Cuchlinski, Jr.
Assistant Examiner—Gertrude Arthur
Attorney, Agent, or Firm—Oliff & Berridge, PLC

[57] ABSTRACT

In an electronic control system for an automatic transmission, a vehicular input signal detecting system samples an analog signal from the sensor based on a pulse signal output to control a solenoid.

12 Claims, 8 Drawing Sheets

VEHICULAR INPUT SIGNAL DETECTING SYSTEM

BACKGROUND OF THE INVENTION

1. Field of Invention

In an electronic control system for an automatic transmission, a solenoid is controlled by a pulse signal output based on an analog signal from a sensor. The invention relates to a vehicular input signal detecting system which is structured so that the sampling of the analog signal from the sensor is timed with the pulse signal output to control the solenoid so that the fluctuation of the pulse signal does not influence the sensor output. This method results in an accurate and stable signal.

2. Description of Related Art

In an electronic control system of an automatic transmission of the prior art, as shown in FIG. 8, an analog input, such as the throttle opening or a vehicle speed, is input from each sensor S at a predetermined sampling period, converted to digital data by A/D input processing, and compared to data stored in a memory of a CPU to identify an output voltage for application to a linear solenoid L for shifting control.

In this control system, noise from the pulse-width-modulated (PWM) output voltage applied to the linear solenoid L causes fluctuation in the voltage waveform of the analog input of each sensor S.

Moreover, for the detection of the vehicle input signal of the prior art, filter processing is executed without any synchronization with the PWM output period. As a result, an accurate and stable input of each sensor S cannot be detected because of the fluctuation in the voltage waveform of the analog input according to the period of the PWM output.

SUMMARY OF THE INVENTION

In an electronic control system for an automatic transmission, a solenoid is controlled by a pulse signal output on the basis of an analog signal from a sensor. A vehicular input signal detecting system of the invention is structured such that the pulse signal controlling the solenoid is timed with the pulse signal for sampling the analog signal from the sensor.

The vehicular input signal detecting system of the invention comprises task schedule unit for scheduling the sampling of a sensor output value based on the timing of the pulse signal. The analog signal is sampled within a range in which the analog signal from the sensor is stable.

The vehicular input signal detecting system of the invention is structured such that the sensor includes a throttle sensor that produces an electrical output according to the depression of an accelerator.

The vehicular input signal detecting system of the invention is structured such that the task schedule unit schedules the sampling of the analog signal from the sensor in sync with the rise of the PWM signal for controlling the solenoid.

The vehicular input signal detecting system of the invention is structured such that the task schedule unit schedules the sampling of the analog signal from the sensor in sync with an instant prior to the rise of the PWM output that acts as the pulse signal for controlling the solenoid.

The vehicular input signal detecting system of the invention is structured such that the sampling period of the analog signal from the sensor is equal to the period of the PWM output.

The vehicular input signal detecting system of the invention is structured such that the solenoid is a linear solenoid for establishing an oil pressure based on the applied electrical output.

The vehicular input signal detecting system of the invention comprises a throttle opening input processing unit for A/D-input-processing, filter-processing of the electrical output from the throttle sensor, and computing of the throttle opening. The analog input, to the throttle opening input processing unit sampled either at the rising instant of the PWM output or at an instant prior to the rise in the PWM output, in accordance with a command from the task schedule unit.

The vehicular input signal detecting system of the invention comprises an oil pressure computing unit for computing the oil pressure of the linear solenoid on the basis of the throttle opening. The throttle opening is computed from the electrical output of the throttle sensor, as sampled either at the rising instant of the PWM output or at an instant prior the rising instant of the PWM output by the throttle opening input processing unit.

The vehicular input signal detecting system of the invention comprises a PWM computing unit for computing the PWM output. The PWM output is computed according to the oil pressure of the solenoid, as computed by the oil pressure computing unit.

The vehicular input signal detecting system is timed with the pulse signal output based on an analog signal from the sensor. The analog signal from the sensor is sampled and output at the same time as the pulse signal for controlling the solenoid is output. As a result, the fluctuation in the PWM output pulse signal as applied to the solenoid, does not influence the sensor output and provides a more accurate and stable signal.

In addition, the task schedule unit senses the PWM output to the solenoid and sends a sampling command to sample the sensor output value within a range in which the analog signal from the sensor is stable. As a result, the fluctuation in the PMW output pulse signal as applied to the solenoid does not influence the signal output from the sensor and provides an a more accurate and stable signal.

The vehicular input signal detecting system is structured such that the throttle sensor outputs an electrical output according to the depression of the accelerator. Thus, when a depression of the accelerator occurs within the range in which the analog signal from the throttle sensor is stable, the signal is sampled and computed. As a result, the fluctuation in the depression of the accelerator does not influence the pulse signal and a more accurate and stable throttle opening is provided.

The vehicular input signal detecting system is structured such that the task schedule unit sends a command signal to sample the analog signal from the sensor in sync with the rise of the PWM output for controlling the solenoid. As a result, the analog signal from the sensor is detected before the analog signal is influenced by the rise of the PWM output to provide a more accurate and stable vehicle input.

The vehicular input signal detecting system is structured such that the task schedule unit sends a signal to sample the analog signal from the sensor in sync with the instant prior to the rise of the PWM output for controlling the solenoid. As a result, the analog signal to be detected from the sensor is stable when the PWM output has a low level, thereby providing a more accurate and stable vehicle input.

The vehicular input signal detecting system is structured such that the sampling period of the analog signal from the sensor is equal to that of the PWM output. As a result, if the number of sampling times is maximized and if the analog signal from the sensor is sampled in sync with either the rise of the PWM output or the instant prior to the rise of the PWM output, the analog signal from the sensor is detected before the analog signal is influenced by the rise of the PWM output and a more accurate and stable vehicle input is provided.

The vehicular input signal detecting system is structured such that a linear solenoid establishes the oil pressure according to the applied electrical output. As a result, the applied electrical output and the oil pressure are proportional to each other to provide enhanced accuracy of the control of the automatic transmission.

The vehicular input signal detecting system is structured such that the throttle opening sensor input processing unit processes the A/D input of the electrical output from the throttle opening sensor. The electrical output is sampled either at the rising instant of the PWM output or at an instant prior to the rising instant of the PWM output, in response to the command from the task schedule unit. The throttle opening is then computed after the filter processing. As a result, the fluctuations in the pulse signal as applied to the solenoid, do not influence the throttle opening so that a more accurate and stable throttle opening is provided. At the same time, the fluctuations in the pulse signal applied to the linear solenoid, will not influence the vehicle speed and the oil temperature inputs so that a more accurate and stable vehicle speed and oil temperature are provided.

The vehicular input signal detecting system is structured such that the oil pressure computing unit computes the oil pressure of the next period of the linear solenoid on the basis of the throttle opening. The throttle opening is computed with the electrical output of the throttle sensor, as sampled either at the rising instant of the PWM output or at the instant which is advanced by a constant phase from the rising instant, and computed by the throttle opening sensor input processing unit. As a result, the oil pressure can be computed with high accuracy.

The vehicular input signal detecting system is structured such that the PWM computing unit computes the PWM output of-the current according to the oil pressure of the next period of the linear solenoid computed by the oil pressure computing unit. As a result, the accuracy of the control of the automatic transmission is enhanced.

BRIEF DESCRIPTION OF THE DRAWINGS

The invention will be described with reference to the drawings in which.

DETAILED DESCRIPTION OF PREFERRED EMBODIMENTS

Figure 1:
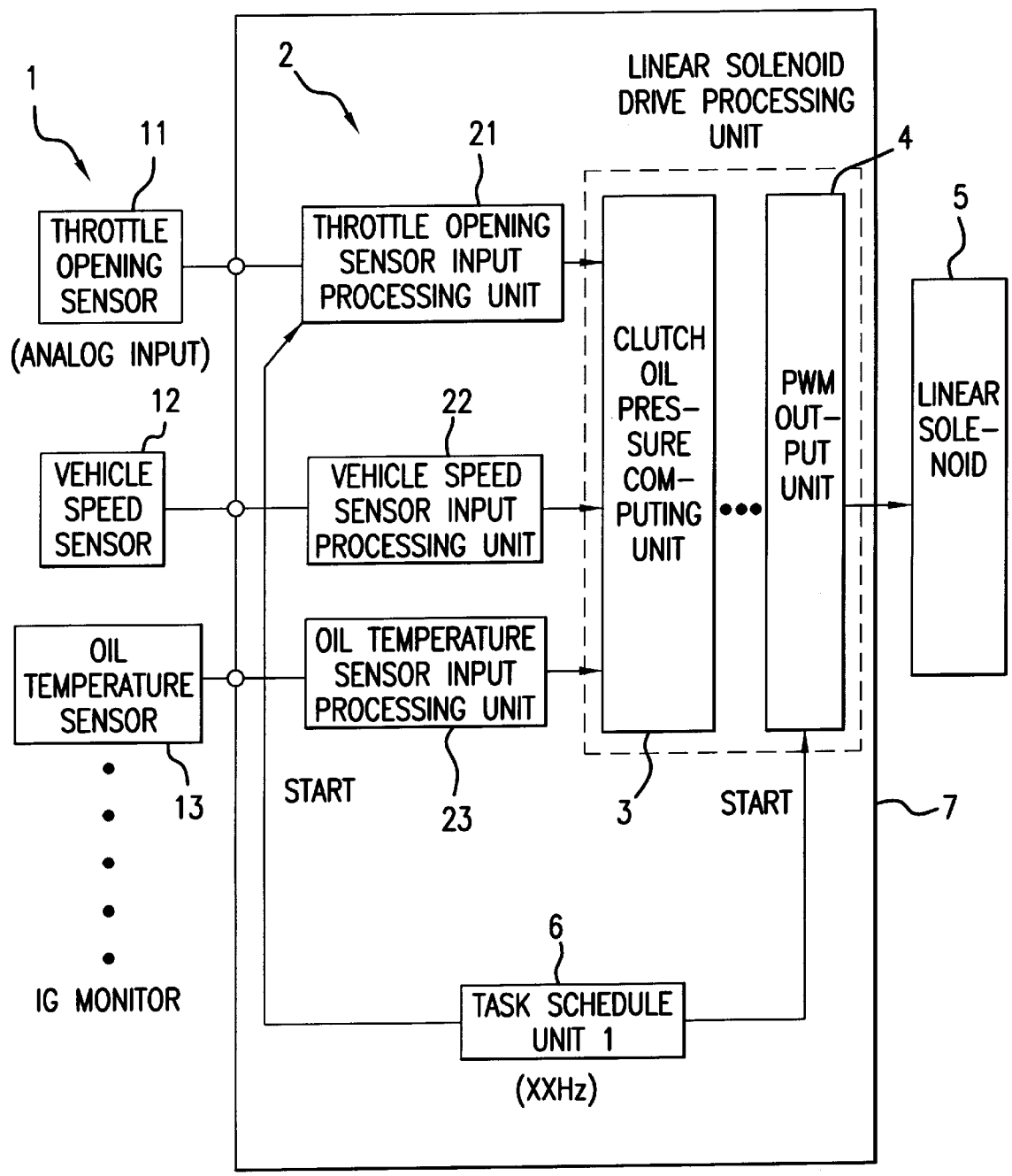
FIG. 1 is a block diagram of the first embodiment of the invention.

The embodiments of the invention will be described with reference to the accompanying drawings.

As shown in FIGS. 1–5, the electronic control system for an automatic transmission includes: a sensor 1 for detecting a vehicular input signal; an input processing unit 2 for converting an analog signal from the sensor 1 into a digital signal; a clutch oil pressure computing unit 3 for computing the output oil pressure of a linear solenoid on the basis of the converted digital signal; a PWM output unit 4 for computing a PWM output current according to the oil pressure as computed from the clutch oil pressure computing unit 3; and a linear solenoid 5 for outputting an oil pressure according to the PWM output. In addition, the vehicular input signal detecting system of the first embodiment comprises task schedule unit 6 for scheduling the sampling of a sensor output value based on the timing of the output pulse signal and within a range where the analog signal from the sensor is stable.

As shown in FIG. 1, the sensor 1 includes: a throttle opening sensor 11 for outputting an electrical signal according to the depression of an accelerator; a vehicle speed sensor 12 for detecting and outputting the speed of a vehicle; and an oil temperature sensor 13 for detecting and outputting the oil temperature of the automatic transmission.

Figure 2:
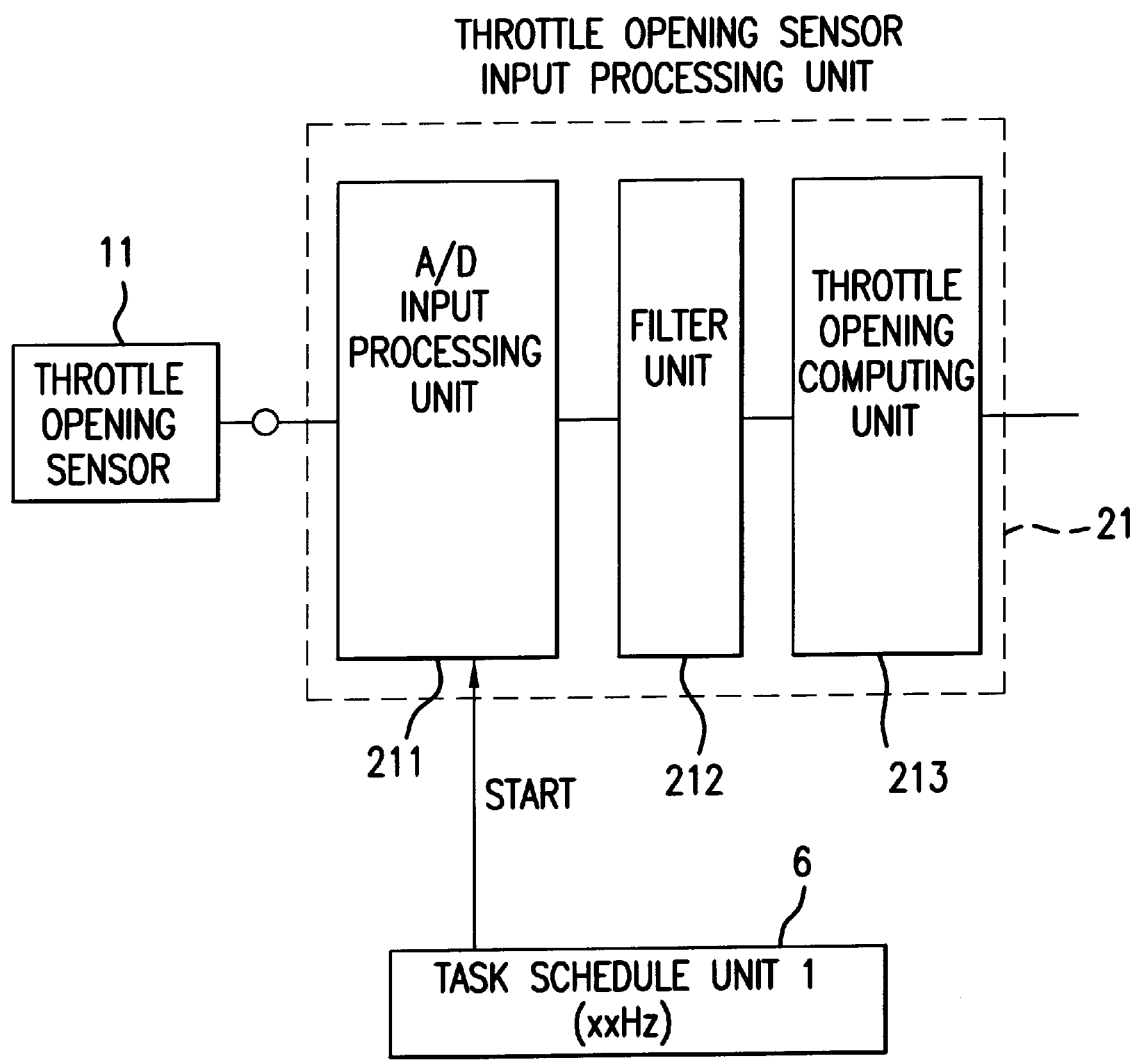
FIG. 2 is a block diagram showing the individual circuits comprising a throttle opening input processing unit in the first embodiment.

The input processing unit 2, shown in FIGS. 1 and 2, comprises: a throttle opening sensor input processing unit 21 connected to the throttle opening sensor 11 for converting the throttle opening into a digital signal; a vehicle speed sensor input processing unit 22 connected to the vehicle speed sensor 12 for converting the speed of the vehicle into a digital signal; and an oil temperature sensor input processing unit 23 connected to the oil temperature sensor 13 for converting the oil temperature of the automatic transmission into a digital signal.

The throttle opening sensor input processing unit 21, shown in FIG. 2, comprises: an A/D input processing unit 211 for sampling and A/D-input-processing the 1r electrical signal from the throttle opening sensor 11 at the rising instant of the PWM output in response to a command from the task schedule unit 6; a filter unit 212 for filter-processing the digitized digital signal; and a throttle opening computing unit 213 for computing the throttle opening on the basis of the filter-processed digital signal.

The vehicle speed input processing unit 22 and the oil temperature input processing unit 23 are structured similar to the throttle opening sensor input processing unit 21. The sampling period of the analog signal from the sensor 1 is set equal to the period of the PWM output.

On the basis of the throttle opening as computed from the throttle opening sensor input processing unit 21, the vehicle speed as computed from the vehicle speed sensor input processing unit 22, and the oil temperature as computed from the oil temperature sensor input processing unit 23, as sampled at the rising instant of the PWM output, the clutch oil pressure computing unit 3 computes the clutch oil pressure by using the reference tables which are stored in advance in the memory unit 71 of a CPU 7.

Figure 3:
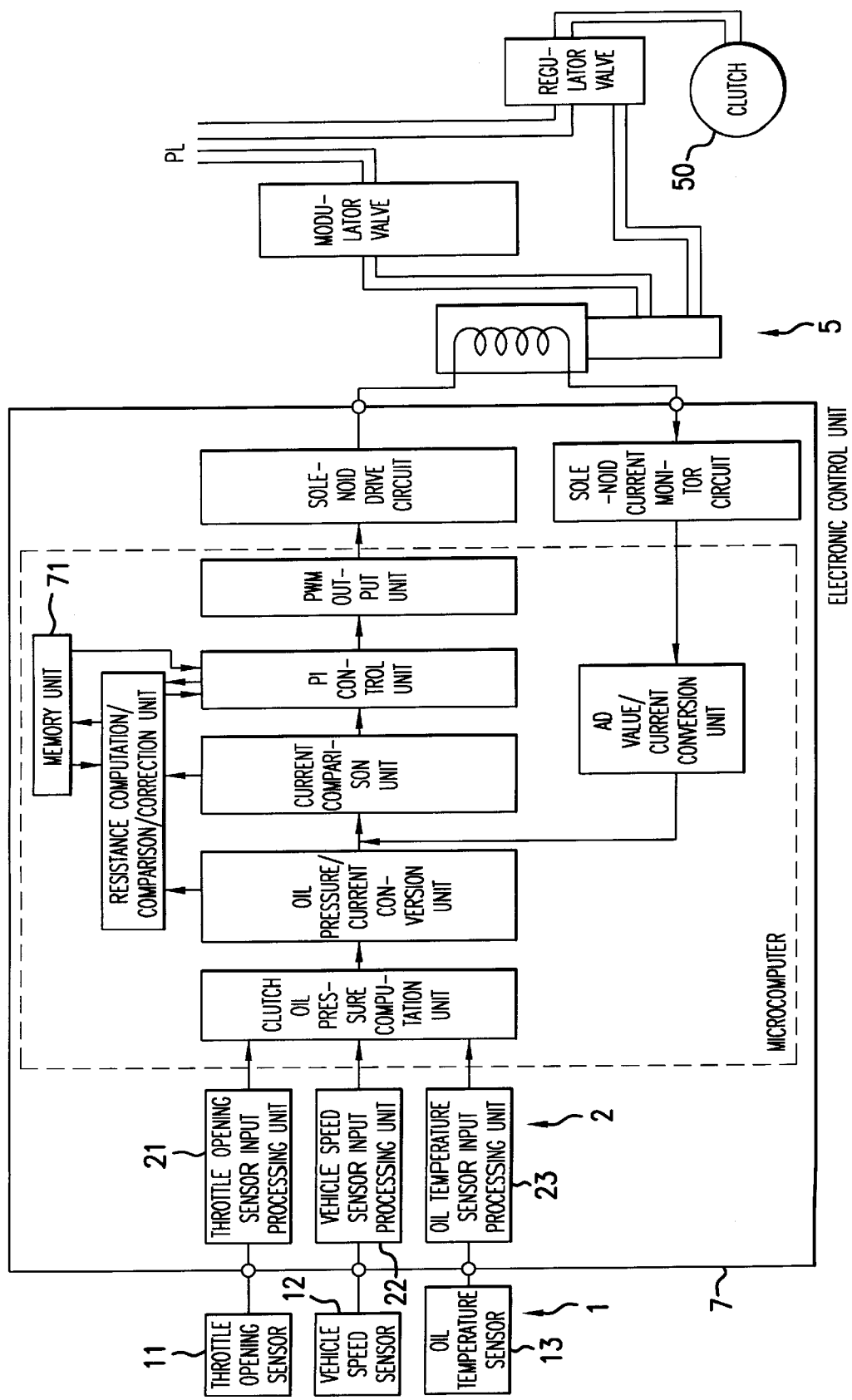
FIG. 3 is a block diagram showing an electronic control system of an automatic transmission according to the first embodiment of the invention.

The PWM output computing unit 4 computes and outputs the PWM output based on the oil pressure of a clutch 50, as computed from the clutch oil pressure computing unit 3, as shown in FIGS. 1 and 3.

The input processing unit 2, the clutch oil pressure computing unit 3 and the PWM output unit 4 are included in CPU 7, as shown in FIGS. 1 and 3.

In sync with the rise of the PWM output for controlling the linear solenoid 5, the task schedule unit 6 senses the rise and sends a sampling command signal for sampling the analog signal from the throttle opening sensor 11.

Figure 4:
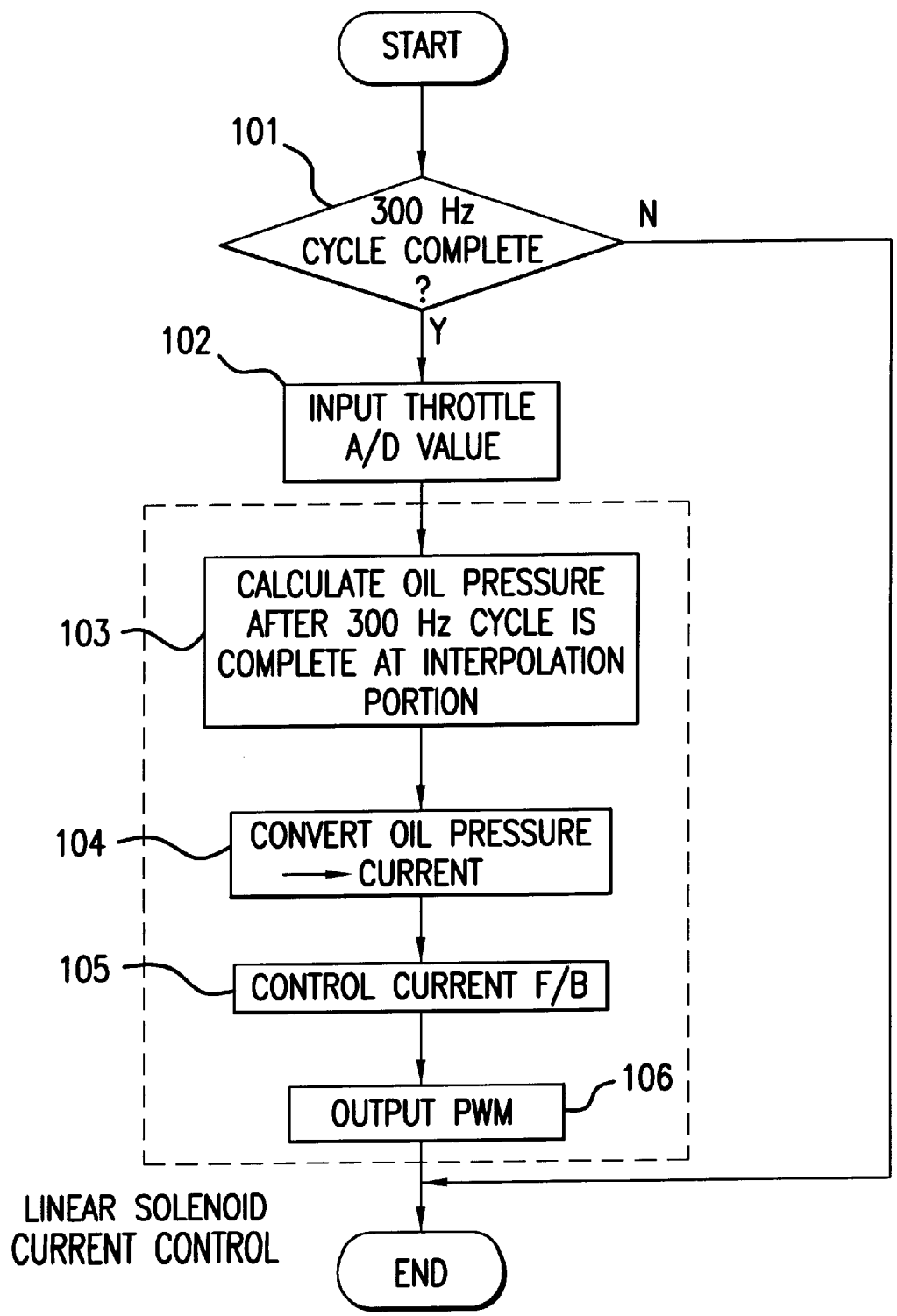
FIG. 4 is a flowchart showing the operating procedure of the first embodiment.
Figure 5:
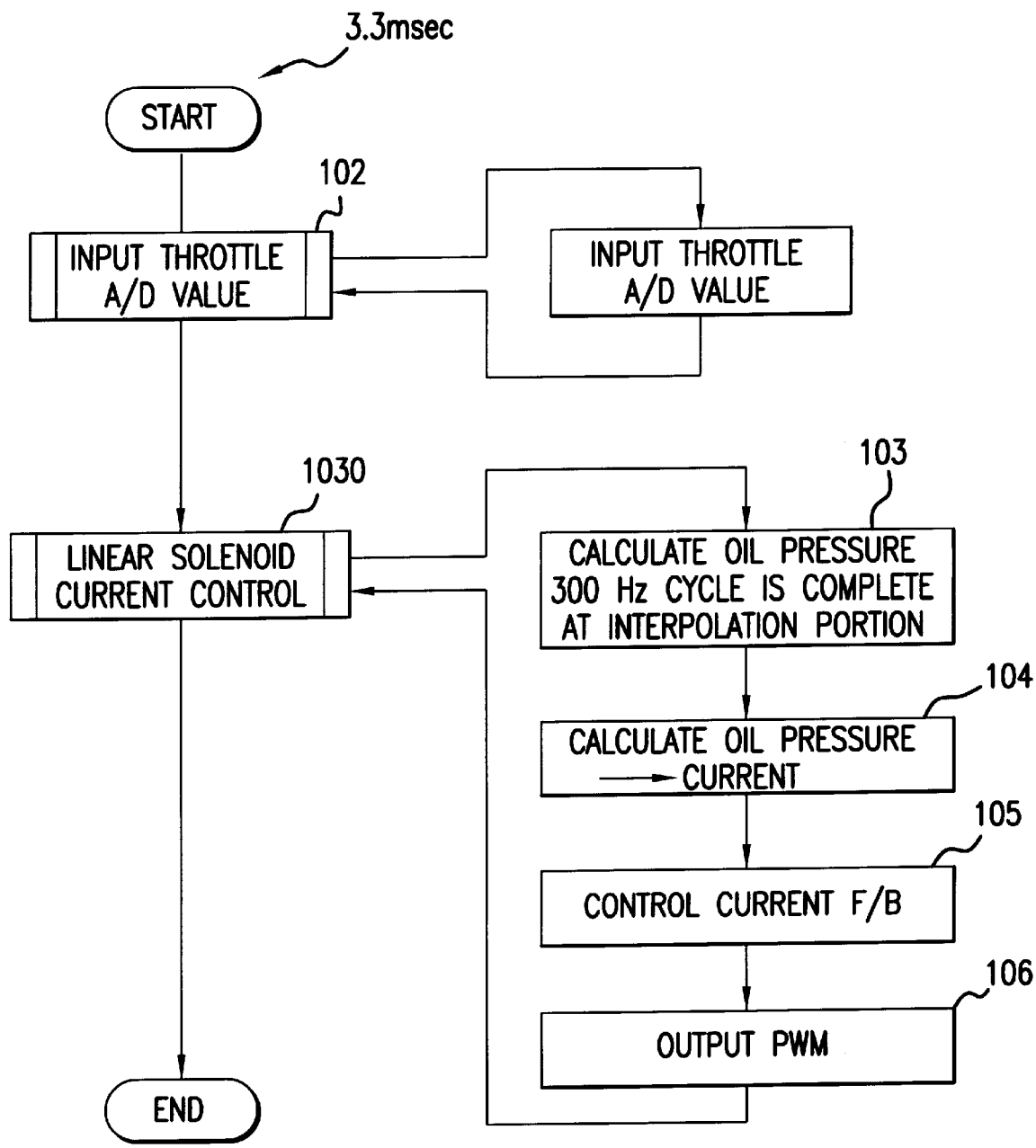
FIG. 5 is a flowchart showing an alternative expression of the operating procedure of the first embodiment.

The operation of the vehicular input signal detecting system of the first embodiment will now be described with reference to FIGS. 4 and 5.

At Step 101, it is determined whether the 300 Hz cycle is complete. If 300 Hz cycle is complete, at Step 102, the electrical output from the throttle opening sensor 11 is sampled and input to the A/D-input processing unit 211 in the throttle opening sensor input processing unit 21.

The clutch oil pressure based upon the throttle 2 opening the 300 Hz cycle is complete, is computed at Step 103 by the clutch oil pressure computing unit 3 and is then converted into a current at Step 104 by the PWM output unit 4.

The converted current is feedback-controlled at Step 105. At step 106, the feedback-controlled current is pulse-width-modulated, and computed to form the PWM output. The PWM output enables the linear solenoid 5 to control the clutch and thus, control shifting. Alternatively, Steps 103 to 106 can be replaced by a linear current control Step 1030, as shown in FIG. 5.

In the electronic control system of the automatic transmission, operation of the vehicular input signal detecting system of the first embodiment times the sampling of the analog signal from the sensor 1 with the pulse signal output to control the linear solenoid 5. As a result, the fluctuation in the pulse signal applied to the linear solenoid 5 does not influence the sensor 1 output, and results in an accurate and stable signal.

In addition, in the vehicular input signal detecting system, the task schedule unit 6 senses output of the pulse signal for controlling the linear solenoid 5 and sends a signal to sample the output value within the range in which the analog signal from the sensor 1 is stable. As a result, the fluctuation in the pulse signal applied to the linear solenoid 5 does not influence the output of the sensor 1. This method provides a more accurate and stable signal.

Moreover, the throttle opening sensor 11 provides an electrical output upon depression of the accelerator. Thus, upon depression of the accelerator, the analog signal from the throttle opening sensor 11 is sampled and computed within a range of stability. As a result, the fluctuation in the pulse signal applied to the linear solenoid 5 does not influence the sensor signal resulting from the depression of the accelerator. This method provides a more accurate and stable throttle opening.

Figure 6:
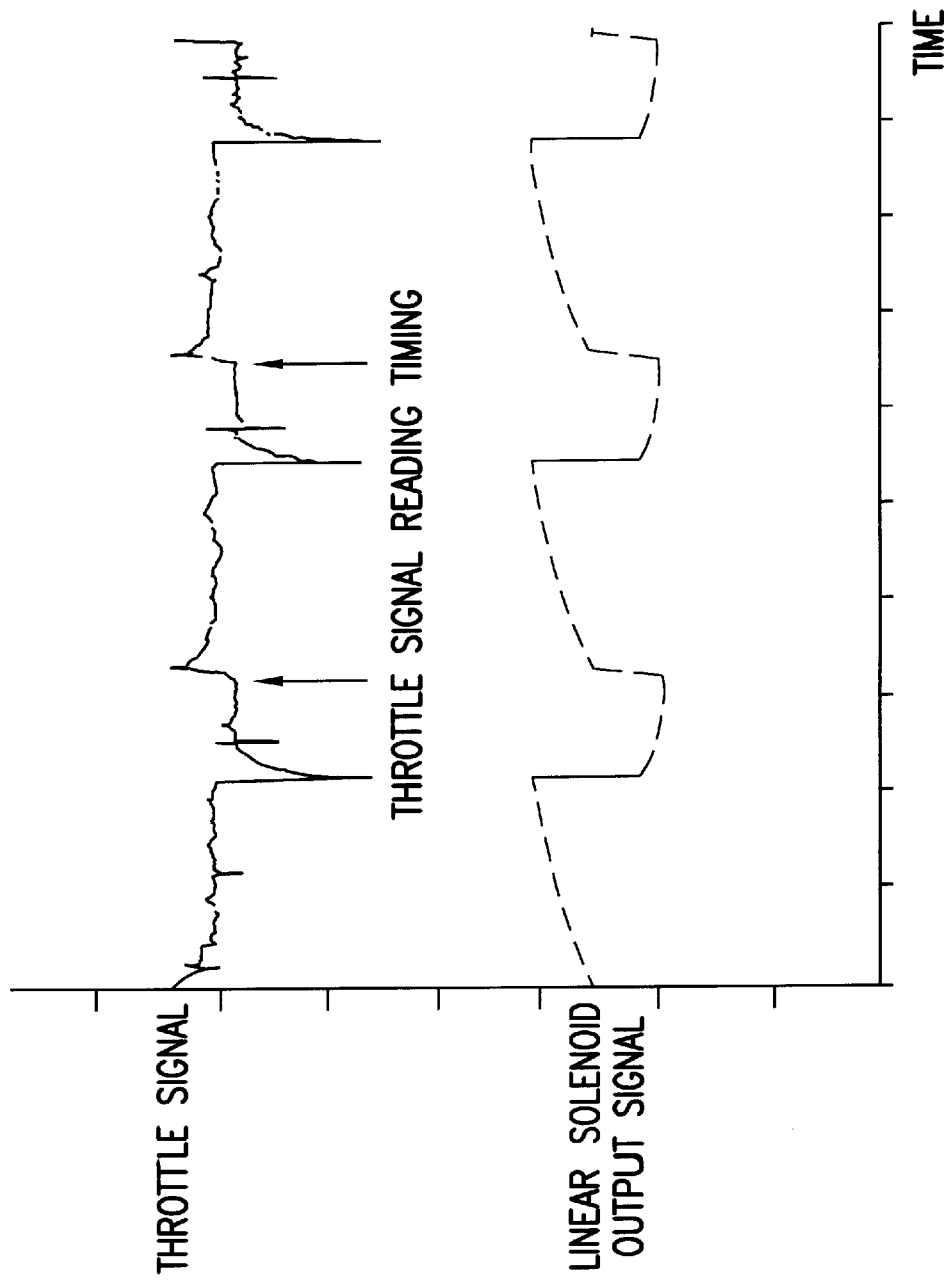
FIG. 6 is a graph showing the relationship between the throttle signal and the PWM output of the first embodiment.

In addition, the task schedule unit 6 schedules the sampling of the analog signal from the throttle opening sensor 11 to be in sync with the rise of the PWM output for controlling the linear solenoid 5, as shown in FIG. 6. As a result, the analog signal from the sensor is detected before the analog signal is influenced by the rise of the PWM output and a more accurate and stable vehicle input is provided.

Specifically, if the period of the PWM output is changed during the solenoid control, the sampling period is changed accordingly. As a result, the A/D input can be stably and accurately sampled without being influenced by the drive noise from the linear solenoid 5.

The sampling period of the analog signal from the sensor 1 is equal to that of the PWM output, as shown in FIG. 6. As a result, the number of sampling times is maximized and the analog signal from the sensor is sampled in sync with the rise of the PWM output. Thus, the analog signal from the sensor 1 is detected before the analog signal is influenced by the rise of the PWM output and a more accurate and stable vehicle input is provided.

In addition, the linear solenoid establishes the oil pressure according to the applied electrical output. As a result, the applied electrical output and the oil pressure are proportional to each other which provides enhanced accuracy of automatic transmission control.

In other words, by controlling the automatic transmission through the use of the linear solenoid 5, the applied electrical signal and the oil pressure are in a one-to-one correspondence to each other so that the accuracy is enhanced. At the same time, the frequency of the PWM is higher than that of another duty solenoid so that the number of sampling times can be increased for finer control.

As sampled upon the rise of the PWM output and in response to the command from the task schedule unit 6, the throttle opening sensor input processing unit 21 processes the A/D input of the electrical output from the throttle opening sensor 11, and computes the throttle opening after the filter processing. As a result, the fluctuations in the pulse signal applied to the linear solenoid 5 do not influence the throttle opening. Thus, this method provides a more accurate and stable throttle opening. Furthermore, fluctuations in the pulse signal do not influence the vehicle speed and the oil temperature output so more accuracy and stability in those signals is also provided.

In addition, the clutch oil pressure computing unit 3 computes the oil pressure based on the throttle opening computed by the throttle opening sensor input processing unit 21. The throttle opening sensor input processing unit 21 computes the throttle opening based on the electrical output of the throttle opening sensor 11 as sampled at the rising instant of the PWM output. As a result, the oil pressure can be computed with high accuracy.

The PWM output unit 4 computes the PWM output of the current according to the oil pressure as computed from the clutch oil pressure computing unit 3 and results in enhanced control of the automatic transmission.

Figure 7:
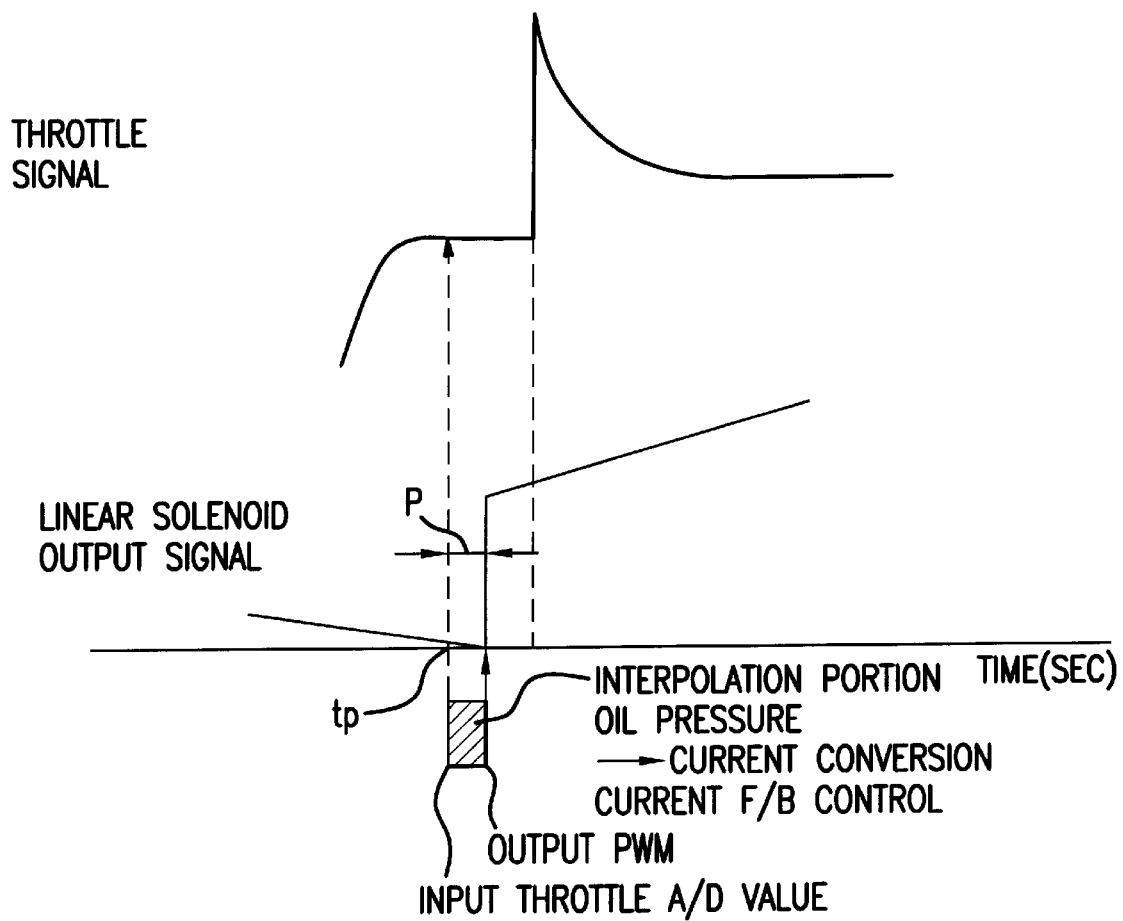
FIG. 7 is a graph showing the relationship between the throttle signal and the PWM output of the second embodiment of the invention.
Figure 8:
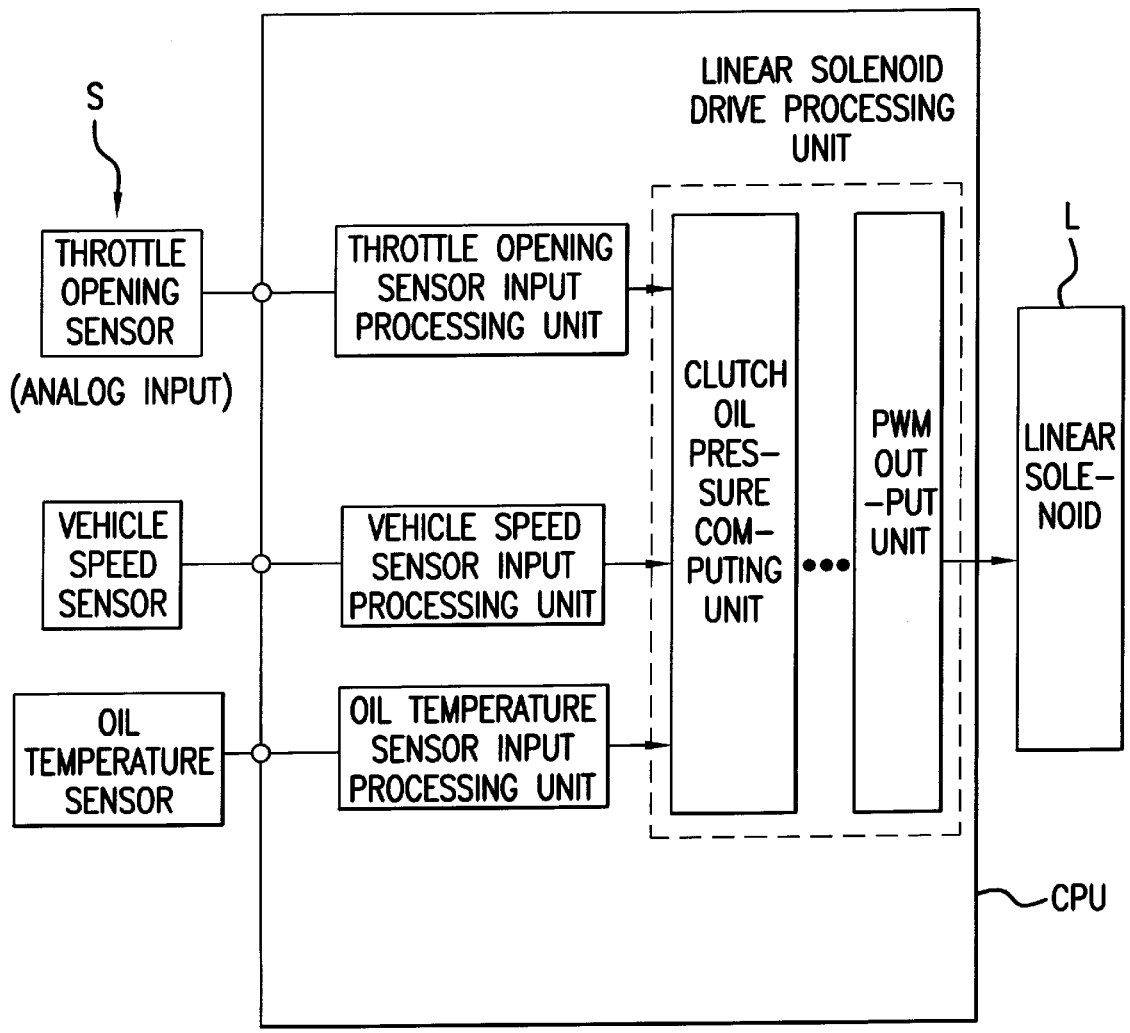
FIG. 8 is a block diagram showing a prior art system.

As shown in FIG. 7, the vehicular input signal detecting system of the second embodiment is different from that of the first embodiment in that the task schedule unit 6 schedules the sampling of the analog signal from the sensor 1 in sync with the instant prior to the rise of the pulse-width-modulated PWM output for controlling the linear solenoid 5.

Therefore, the analog signal from the sensor 1 is sampled at an instant tp, which is prior to the rise of the PWM output, as shown in FIG. 6. As a result, the analog signal to be detected from the sensor 1 is stable when the PWM output has a low level and provides a more accurate and stable vehicle input. Furthermore, the analog signal is sampled at the instant prior to the PWM output, so that the time period for the subsequent computation is longer.

The embodiments are presented for the purpose of description, and the invention should not be limited thereto but can be modified as could be recognized by those skilled in the art from the scope of the claims, the detailed description of the invention and the drawings.

The first embodiment has been described from the example, in which the sampling period of the analog signal from the sensor 1 is equal to that of the PWM output. Despite this description, however, the invention should not be limited thereto. For example, the analog signals from the sensor 1 can be sampled all at once, if necessary, for a plurality of periods of the PWM output.

In the embodiments, the invention has been applied to the electronic control system of the automatic transmission, but the invention can be applied to other automobile control systems, such as the engine control, brake control and suspension control, which also require the sampling of the input signal in sync with the output pulse.

What is claimed is:

1. A vehicular input signal detecting system, comprising:

a sensor that outputs an analog signal having a value;

a solenoid controlled by a pulse signal; and an electronic control unit that outputs the pulse signal with a predetermined period based on the value of the analog signal, and samples the analog signal only at predetermined times according to a sampling period determined by the predetermined period of the pulse signal.

2. The vehicular input signal detecting system of claim 1, further comprising:

task schedule unit for sampling the output value within a range in which the analog signal from the sensor is stable based on timing of the pulse signal.

3. The vehicular input signal detecting system of claim 2, wherein the sensor includes a throttle sensor for outputting an electrical signal upon sensing a depression of an accelerator.

4. The vehicular input signal detecting system of claim 3, wherein the task schedule unit schedules the sampling of the analog signal from the sensor in sync with a rise of a pulse-width-modulated signal, the pulse-width modulated signal being the pulse signal for controlling the solenoid.

5. The vehicular input signal detecting system of claim 4, wherein the solenoid is a linear solenoid, the linear solenoid establishing an oil pressure according to the electrical signal.

6. The vehicular input signal detecting system of claim 5, further comprising:

throttle opening input processing means for computing a throttle opening based on A/D-input-processing and filter-processing of the electrical signal from the throttle sensor, the electrical signal sampled either at a rising instant of the pulse width modulated output or at an instant prior to the rising instant of the pulse width modulated output in response to a command from the task schedule unit.

7. The vehicular input signal detecting system of claim 6, further comprising:

oil pressure computing means for computing the oil pressure of a next period of the linear solenoid based on the throttle opening, the throttle opening being computed from the electrical output of the throttle sensor sampled either at a rising instant of the pulse width modulated output from the throttle opening input processing means or at an instant prior to the rising instant of the pulse width modulated output.

8. The vehicular input signal detecting system of claim 7, further comprising:

pulse width modulated computing means for computing the pulse width modulated output of a current according to an oil pressure as computed by the oil pressure computing means.

9. The vehicular input signal detecting system of claim 3, wherein the task schedule unit is structured to sample the analog signal from the sensor in sync with an instant prior to a rise of the pulse-width-modulated output, the pulse-width modulated signal being the pulse signal for controlling the solenoid.

10. The vehicular input signal detecting system of claim 4, wherein a sampling period of the analog signal from the sensor is equal to a period of the pulse-width-modulated output.

11. The vehicular input signal detecting system of claim 9, wherein a sampling period of the analog signal from the sensor is equal to a period of the pulse-width-modulated output.

12. The vehicular input signal detecting system of claim 9, wherein the solenoid is a linear solenoid, the linear solenoid establishing an oil pressure according to the electrical signal.

* * * * *